(12) United States Patent
Baca et al.

(10) Patent No.: US 11,808,993 B2
(45) Date of Patent: Nov. 7, 2023

(54) MOLDED FERRULE HOLDER WITH COUPLING FEATURES FOR OPTICAL FIBER CONNECTORS

(71) Applicant: CORNING RESEARCH & DEVELOPMENT CORPORATION, Corning, NY (US)

(72) Inventors: Adra Smith Baca, Hickory, NC (US); Micah Colen Isenhour, Lincolnton, NC (US)

(73) Assignee: Corning Research & Development Corporation, Corning, NY (US)

( * ) Notice: Subject to any disclaimer, the term of this patent is extended or adjusted under 35 U.S.C. 154(b) by 157 days.

(21) Appl. No.: 17/521,013

(22) Filed: Nov. 8, 2021

(65) Prior Publication Data

US 2022/0155533 A1 May 19, 2022

Related U.S. Application Data

(60) Provisional application No. 63/115,754, filed on Nov. 19, 2020.

(51) Int. Cl.
*G02B 6/38* (2006.01)

(52) U.S. Cl.
CPC .................. *G02B 6/3869* (2013.01)

(58) Field of Classification Search
CPC .................. G02B 6/38; G02B 6/3869
See application file for complete search history.

(56) References Cited

U.S. PATENT DOCUMENTS

| | | | |
|---|---|---|---|
| 5,658,364 A | 8/1997 | Devore et al. | |
| 5,993,070 A * | 11/1999 | Tamekuni | G02B 6/3846 385/83 |
| 6,283,644 B1 * | 9/2001 | Gilliland | G02B 6/4244 385/88 |
| 6,491,444 B1 | 12/2002 | Greub et al. | |
| 7,066,656 B2 * | 6/2006 | Demissy | G02B 6/3859 385/60 |
| 7,572,064 B2 | 8/2009 | deJong | |
| RE43,542 E | 7/2012 | Murray et al. | |
| 9,690,055 B2 | 6/2017 | Wu | |
| 9,810,857 B2 | 11/2017 | Cervantes et al. | |
| 10,162,128 B2 | 12/2018 | Nielson | |
| 2003/0048996 A1 * | 3/2003 | Lowe | G02B 6/38875 385/81 |
| 2003/0081909 A1 * | 5/2003 | Taira | G02B 6/3851 385/78 |
| 2010/0054670 A1 * | 3/2010 | Milette | G02B 6/3806 385/136 |
| 2016/0139344 A1 | 5/2016 | De Los Santos Campos et al. | |
| 2018/0217335 A1 * | 8/2018 | Leeson | G02B 6/3833 |
| 2020/0096710 A1 * | 3/2020 | Rosson | G02B 6/387 |
| 2022/0236496 A1 * | 7/2022 | Leeson | G02B 6/3869 |

FOREIGN PATENT DOCUMENTS

| | | | |
|---|---|---|---|
| EP | 2279441 B1 | 1/2016 | |
| JP | 10-160970 A | 6/1998 | |
| JP | 3440408 B2 | 8/2003 | |

* cited by examiner

*Primary Examiner* — Eric Wong (57) ABSTRACT

The present disclosure relates to a molded ferrule holder that can be coupled to a ferrule eliminating the need for automated injection molding machines and allowing for the use of low cost, low temperature polymers for the ferrule holder materials.

15 Claims, 10 Drawing Sheets

MOLDED FERRULE HOLDER WITH COUPLING FEATURES FOR OPTICAL FIBER CONNECTORS

PRIORITY APPLICATION

This application claims the benefit of priority of U.S. Provisional Application No. 63/115,754, filed on Nov. 19, 2020, the content of which is relied upon and incorporated herein by reference in its entirety.

FIELD OF THE DISCLOSURE

This disclosure relates to ferrule holders, and more particularly, to a molded ferrule holder with integrated features for coupling to a ferrule used in optical fiber applications.

BACKGROUND OF THE DISCLOSURE

In a system that uses fiber optic cables, there are typically many locations where the cables connect to equipment or other fiber optic cables. Fiber optic connectors are provided on the ends of the cables to allow the transfer of light at these connection points. The process of installing a fiber optic connector on an optical fiber of a cable is sometimes referred to as "connectorization," and this process may be done in the field (e.g., with "field-installable" connectors) or in a factory (e.g., during the manufacturing of the fiber optic cables to provide "pre-terminated" cable assemblies).

Figure 1:
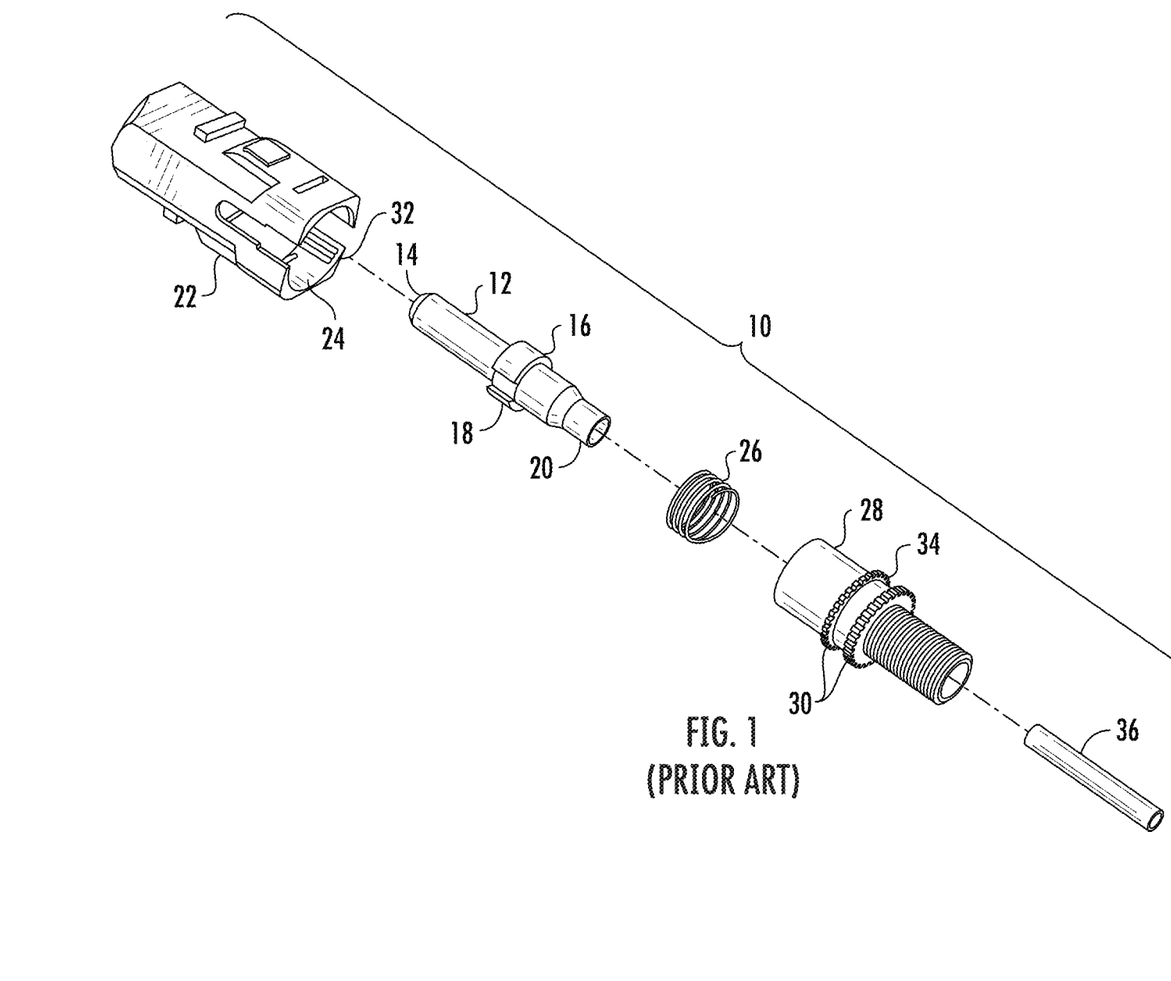
FIG. 1 is an exploded, isometric view of a conventional optical fiber connector having a rear-loading ferrule holder.

FIG. 1 illustrates an example of a conventional SC-type fiber optic connector 10. In general, the fiber optic connector 10 includes a ferrule 12 having a mating end 14 and an insertion end (not shown), a ferrule holder 16 having opposed first and second end portions 18, 20, and an inner housing 22. The insertion end of the ferrule 12 is received in the first end portion 18 of the ferrule holder 16 while the mating end 14 remains outside the ferrule holder 16. Typically, the ferrule 12 is secured to the ferrule holder 16 using a press fit and/or adhesive, or by overmolding the ferrule holder 16 onto the ferrule 12, thereby forming a ferrule assembly. To assemble the fiber optic connector 10, the ferrule assembly is received in an internal cavity of the inner housing 22. In particular, the ferrule holder 16 is inserted into a rear opening 24 of the inner housing 22 and advanced until the mating end 14 of the ferrule 12 is positioned proximate or projects slightly beyond a front opening (not shown) of the inner housing 22. A spring 26 is then disposed around the second end portion 20 of the ferrule holder 16, after which a crimp body 28 is inserted into the rear opening 24 of the inner housing 22 and over the second end portion 20 of the ferrule holder 16 and the spring 26. The crimp body 28 has a plurality of radial teeth 30 that align with grooves 32 within the rear opening 24 of the inner housing 22 and a snap fit flange 34 that securely mates with a complementary snap fit feature (not shown) within the inner housing 22. An unterminated fiber optic cable 36 can then be passed through the crimp body 28 to be mated with the ferrule assembly for final assembly of the connectorized optical cable. In particular, an optical fiber of the fiber optic cable 36 extends through the crimp body 28, into the inner housing 22, and through the ferrule holder 16 to the ferrule 12, to which the optical fiber is secured.

These and other methods of assembling fiber optic cable connectors include a number of mechanical steps and typically may include manual labor. The influence of manual labor in the assembly process provides cost, affects consistency, and can decrease throughput in processing fiber optic connector terminations. Automated fiber optic connector termination processes for fiber optic cable preparations have been employed to reduce manual labor influence, but at significant capital costs. Even so, these automated fiber optic connector termination processes may not be flexible with respect to terminating varieties of fiber optic connectors or fiber optic cable types. Further, with these fiber optic connector termination processes, if one fiber optic connector termination fails, it must be reworked or the entire fiber optic cable must be scrapped. In either case, the fiber optic cable assembly can be delayed, thereby disrupting fiber optic cable assembly throughput and increasing scrapped fiber optic cables, increasing costs as a result.

SUMMARY OF THE DISCLOSURE

The present disclosure relates to a molded ferrule holder that can be coupled to a ferrule eliminating the need for automated injection molding machines and allowing for the use of low cost, low temperature polymers for the ferrule holder materials.

In one embodiment, a ferrule assembly is provided. The ferrule assembly comprising: a ferrule comprising a plurality of notches arranged around a circumference of the ferrule, wherein the plurality of notches are diametrically opposed about a longitudinal axis of the ferrule; a ferrule holder coupled to the ferrule, wherein the ferrule holder is made of at least one of: a liquid crystal polymer, polycarbonate (PC), polybutylene terephthalate, acrylonitrile butadiene styrene (ABS), PC/ABS blend, polymethylpentene (TPX or PMP), polycyclohexylenedimethylene (PCT), cycloolefinic polymer (COC), glass filled PC, PBT or polyamides, or PC siloxane; and wherein the ferrule holder imparts a strain of between about 4% to 6% onto the ferrule as measured by ASTM D638.

In another embodiment, the ferrule holder includes a plurality of protrusions corresponding to the plurality of notches, wherein the plurality of protrusions can engage with the plurality of notches to couple the ferrule and the ferrule holder. In another embodiment, the ferrule and the ferrule holder are in a snap fit configuration. In another embodiment, the ferrule holder includes a plurality of flexible arms engageable with the plurality of notches of the ferrule. In another embodiment, the plurality of flexible arms each include a protrusion corresponding to the plurality of notches, wherein the protrusions engage with the plurality of notches to couple the ferrule and the ferrule holder. In another embodiment, the ferrule holder is movable between an open configuration and a closed configuration; wherein in the open configuration, the flexible arms are angled with respect to a longitudinal axis of the ferrule holder; and wherein in the closed configuration, the flexible arms are substantially parallel to the longitudinal axis and the flexible arms engage with the notches of the ferrule. In another embodiment, the ferrule holder has a processing temperature between 100° C. and 300° C. as measured by a melt flow index.

In one embodiment, a method of making a ferrule holder is provided. The method of making a ferrule holder comprising: inserting a material into a cavity of a mold, wherein the cavity of the mold is shaped as the ferrule holder, wherein the material is in a molten state at a processing temperature ranging between 100° C. and 350° C. as measured by a melt flow index; cooling the material for a duration between 0.5 seconds and 20 seconds; and disassembling the mold.

In another embodiment, the material is made of at least one of: a liquid crystal polymer, polycarbonate (PC), polybutylene terephthalate, acrylonitrile butadiene styrene (ABS), PC/ABS blend, polymethylpentene (PMP), polycyclohexylenedimethylene (PCT), cycloolefinic polymer (COC), polyamides, or PC siloxane. In another embodiment, the material is selected from the group consisting of: a liquid crystal polymer, polycarbonate (PC), polybutylene terephthalate, acrylonitrile butadiene styrene (ABS), PC/ABS blend, polymethylpentene (PMP), polycyclohexylenedimethylene (PCT), cycloolefinic polymer (COC), polyamides, or PC siloxane. In another embodiment, the processing temperature is between 150° C. and 300° C. as measured by a melt flow index. In another embodiment, the ferrule holder has a processing temperature between 225° C. and 300° C. as measured by a melt flow index. In another embodiment, the ferrule holder includes a plurality of flexible arms; wherein the plurality of flexible arms each include a protrusion configured to engage with a plurality of notches on a ferrule to couple the ferrule and the ferrule holder. In another embodiment, the ferrule holder is movable between an open configuration and a closed configuration; wherein in the open configuration, the flexible arms are angled with respect to a longitudinal axis of the ferrule holder; and wherein in the closed configuration, the flexible arms are substantially parallel to the longitudinal axis and the flexible arms engage with the notches of the ferrule.

In one embodiment, a method of assembling a ferrule and a ferrule holder to form a ferrule assembly, wherein the ferrule includes a front end, a rear end, and a plurality of notches around a circumference of the ferrule, and wherein the ferrule holder includes a front opening and a plurality of protrusions is provided. The method comprising: inserting a rear end of the ferrule into a front end of the ferrule holder; and engaging the plurality of protrusions with the plurality of notches to couple the ferrule and the ferrule holder in a snap fit configuration; wherein the ferrule holder imparts a strain of between about 4% to 6% onto the ferrule as measured by ASTM D638.

In another embodiment, the ferrule holder includes a plurality of flexible arms engageable with the plurality of notches of the ferrule. In another embodiment, the plurality of flexible arms each include protrusions corresponding to the plurality of notches, wherein the protrusions engage with the plurality of notches to couple the ferrule and the ferrule holder. In another embodiment, the ferrule holder is movable between an open configuration and a closed configuration; wherein in the open configuration, the flexible arms are angled with respect to a longitudinal axis of the ferrule holder; and wherein in the closed configuration, the flexible arms are substantially parallel to the longitudinal axis and the flexible arms engage with the notches of the ferrule. In another embodiment, the ferrule is inserted into the ferrule holder when the ferrule holder is in the open configuration, and the ferrule holder moves to the closed configuration once the notches are within a bore of the ferrule holder such that the plurality of protrusions of the flexible arms of the ferrule holder engage with the plurality of notches. In another embodiment, the ferrule holder is made of at least one of: a liquid crystal polymer, polycarbonate (PC), polybutylene terephthalate, acrylonitrile butadiene styrene (ABS), PC/ABS, polymethylpentene (TPX or PMP), polycyclohexylenedimethylene (PCT), cycloolefinic polymer (COC), glass filled PC, PBT or polyamides.

In one embodiment, a fiber optic connector assembly is provided. The fiber optic connector assembly comprising: an inner housing having an internal cavity; a ferrule assembly received in the internal cavity, the ferrule assembly comprising: a ferrule comprising a plurality of notches arranged around a circumference of the ferrule, wherein the plurality of notches are diametrically opposed about a longitudinal axis of the ferrule; a ferrule holder coupled to the ferrule, wherein the ferrule holder is made of at least one of: a liquid crystal polymer, polycarbonate (PC), polybutylene terephthalate, acrylonitrile butadiene styrene (ABS), PC/ABS blend, polymethylpentene (TPX or PMP), polycyclohexylenedimethylene (PCT), cycloolefinic polymer (COC), glass filled PC, PBT or polyamides, or PC siloxane; and wherein the ferrule holder imparts a strain of between about 4% to 6% onto the ferrule as measured by ASTM D638.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the present disclosure relates to a molded ferrule holder that can be formed prior to being coupled to a ferrule, thereby eliminating the need for automated injection molding machines and allowing for the use of low cost, low temperature polymers for the ferrule holder materials.

Figure 2:
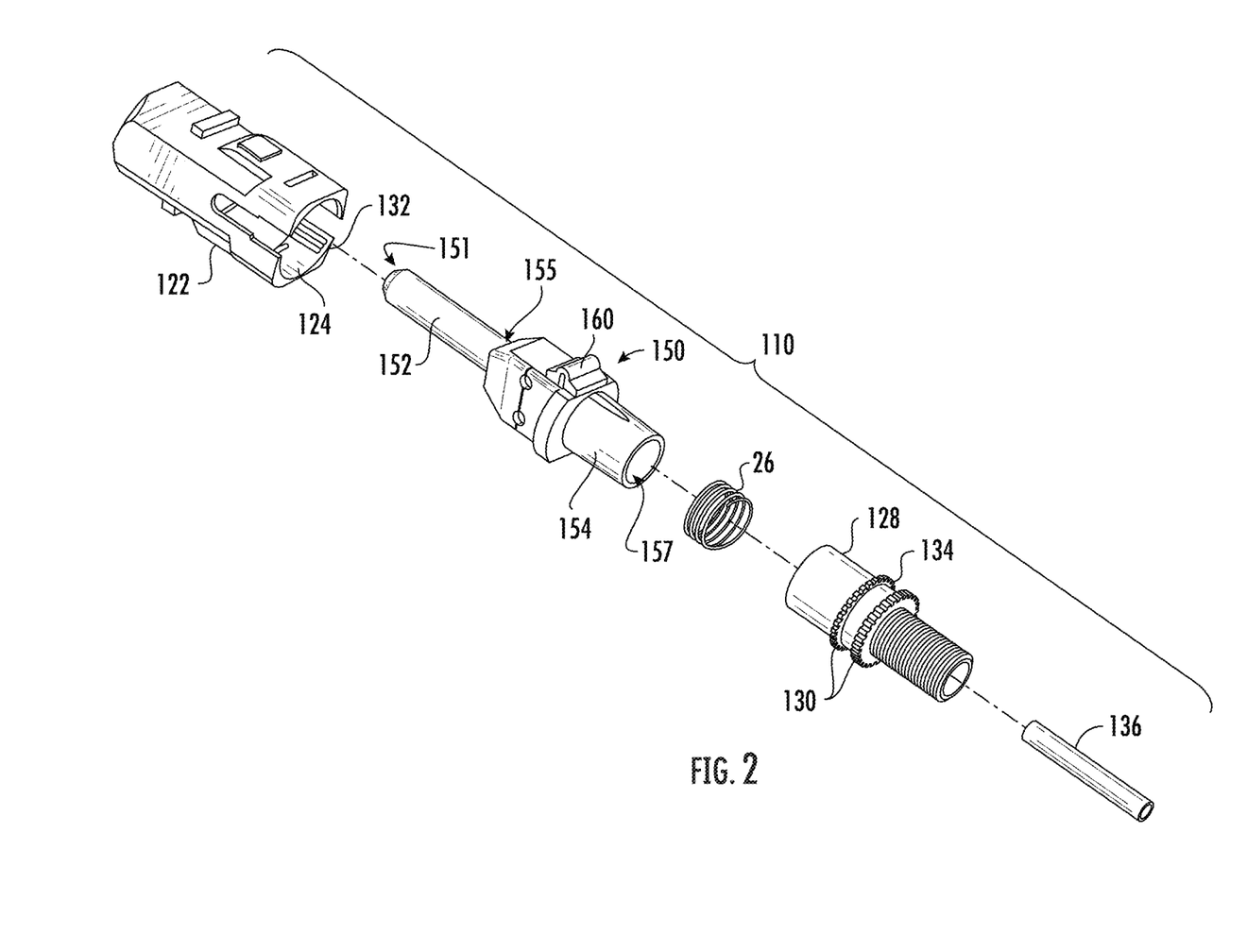
FIG. 2 is an exploded, isometric view of an optical fiber connector of the present disclosure having a molded ferrule holder in accordance with the present disclosure.

Referring first to FIG. 2, a fiber optic connector 110 is shown. FIG. 2 includes similar components as FIG. 1 except as noted herein, and like parts in FIG. 2 have the same reference numbers as those in FIG. 1 with 100 added thereto. While an SC type connector is shown in FIG. 2, it is within the scope of the present disclosure that alternate suitable connectors with corresponding components may be used (e.g., LC type connectors). In general, the fiber optic connector 110 includes a ferrule assembly 150 that includes a ferrule 152 having a mating (or front) end 151 and an insertion (or rear) end 153 (FIGS. 3-11), a ferrule holder 154 having opposed first and second end portions 155, 157, and an inner housing 122. The insertion end 153 of the ferrule 152 is received in the first end portion 155 of the ferrule holder 154 while the mating end 151 remains outside the ferrule holder 154. To assemble the fiber optic connector 110, the ferrule holder 154 is inserted into a rear opening 124 of the inner housing 122 such that the mating end 151 of the ferrule 152 is positioned proximate a front opening (not shown) of the inner housing 122. A spring 126 is then disposed around the second end portion 157 of the ferrule holder 154, after which a crimp body 128 is inserted into the rear opening 124 of the inner housing 122 and over the second end portion 157 of the ferrule holder 154 and the spring 126. The crimp body 128 has a plurality of radial teeth 130 that align with grooves 132 within the rear opening 124 of the inner housing 122 and a snap fit flange 134 that securely mates with a complementary snap fit feature (not shown) within the inner housing 122. An unterminated fiber optic cable 136 can then be passed through the crimp body 128 to be mated with the ferrule holder 154 for final assembly of the connectorized optical cable.

Figure 3:
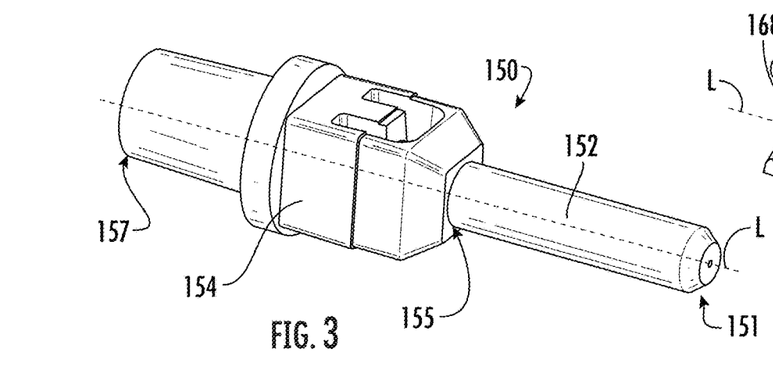
FIG. 3 is a perspective view of an alternate molded ferrule holder coupled to a ferrule.
Figure 4:
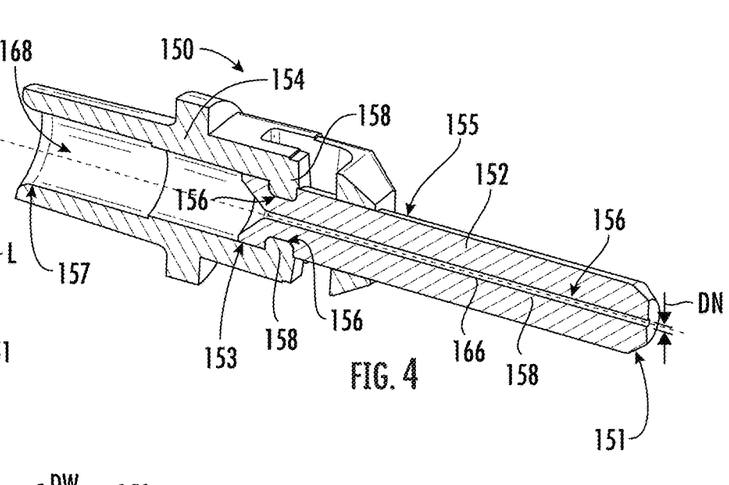
FIG. 4 is a cross sectional view of the molded ferrule holder and the ferrule of FIG. 3.
Figure 5:
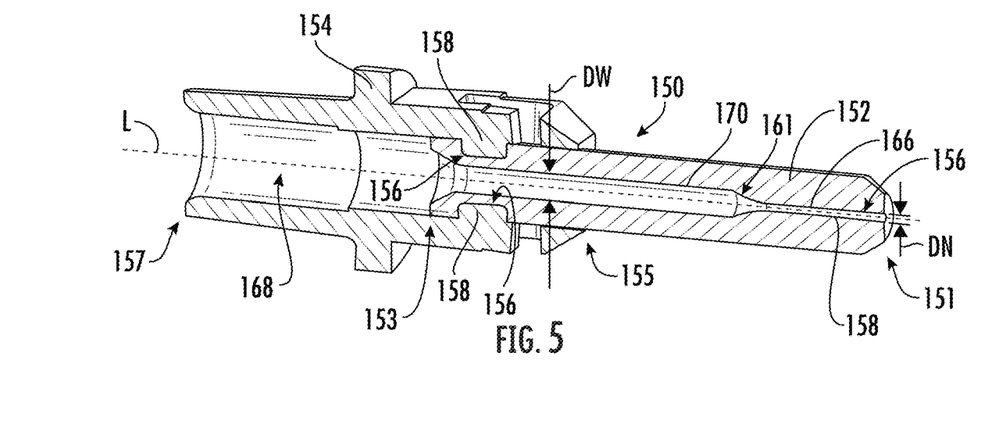
FIG. 5 is another cross-sectional view of the molded ferrule holder coupled to an alternate ferrule in accordance with the present disclosure.

Referring now to FIGS. 3-5, an embodiment of ferrule assembly 150 is shown. As mentioned previously, ferrule assembly 150 includes a ferrule 152 and a ferrule holder 154. Ferrule 152 includes an inner surface 158 forming the ferrule bore 156. The ferrule bore 156 extends axially through the ferrule 152 from rear end 153 to front end 151 of ferrule 152. In some embodiments, ferrule bore 156 is used to precisely position an end portion of optical fiber 136 for establishing optical connections with other optical devices (not shown).

Figure 9:
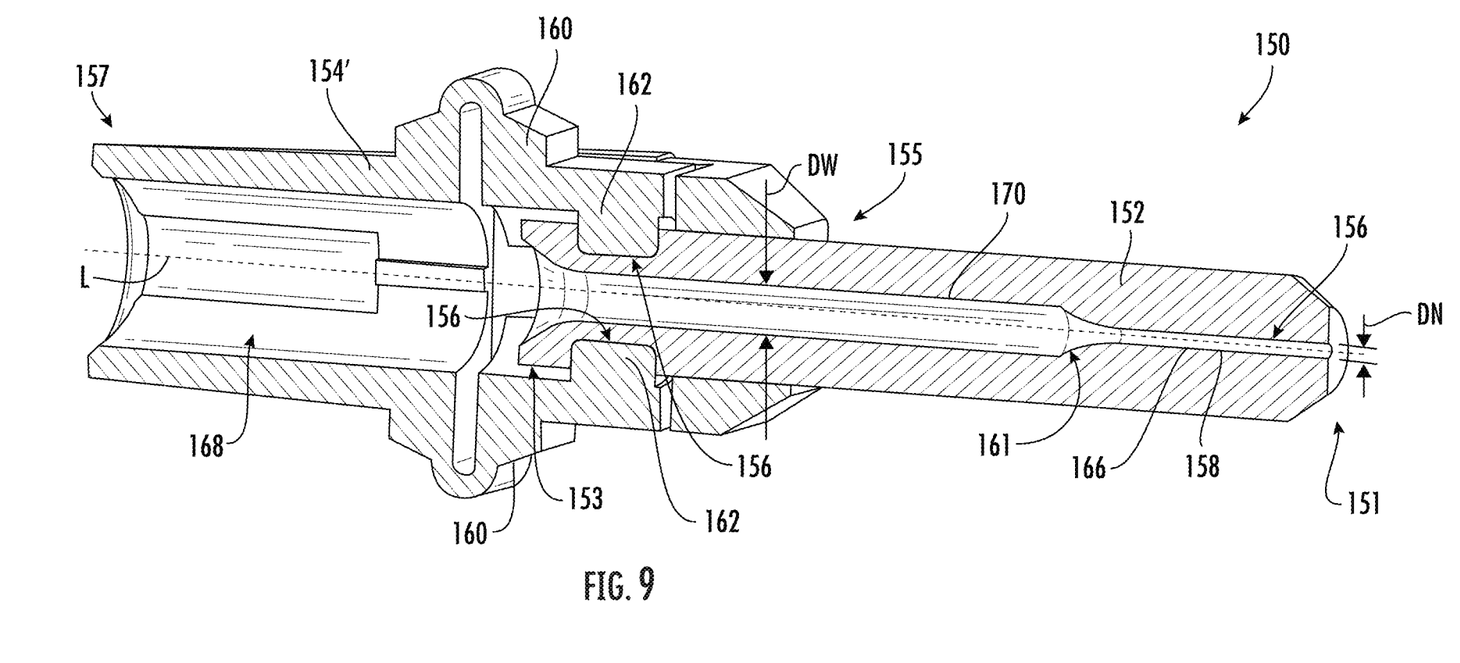
FIG. 9 is a cross-sectional view of the molded ferrule holder of FIGS. 6-8 coupled to an alternate ferrule in accordance with the present disclosure.

In the embodiment shown in FIGS. 3 and 4, the ferrule bore 156 includes a narrow bore section 166 having a diameter DN at the front end 151 of the ferrule 152 that extends along the entire length or substantially entire length of the ferrule bore 156. In other embodiments, as shown in FIGS. 5 and 9, ferrule bore 156 includes a narrow bore section 166 having a diameter DN at the front end 151 of the ferrule 152 and a wide bore section 170 having a diameter DW, which is larger than DN, at the rear end 153 of the ferrule 152. In this embodiment, ferrule bore 156 includes a funnel section 161 (or "transition section") that is disposed between wide bore section 170 and narrow bore section 166 and is configured to guide an end of an optical fiber into narrow bore section 166. In this manner, the inner surface 158 of the ferrule 152 may precisely hold the end portion of the optical fiber 136 within the ferrule bore 156 and provide close proximity between the two objects, so that the end portion of the optical fiber 136 and the inner surface 158 of the ferrule 152 may be more easily secured.

In some embodiments, ferrule 152 is made of a ceramic, or a yttrium stabilized zirconia. However, it is within the scope of the present disclosure that other suitable materials for ferrule 152 may be used, such as glass, quartz, glass ceramic, ion exchange glass, etc., for example.

Ferrule 152 includes a pair of notches 156 along a circumference of ferrule 152 that are diametrically opposed to each other. As shown, notches 156 are configured to engage with ferrule holder 154 and couple ferrule 152 and ferrule holder 154. In alternate embodiments, ferrule 152 includes a greater number of notches 156 in a different configuration about the circumference of ferrule 152.

As mentioned previously, ferrule assembly 150 includes ferrule holder 154 that couples to ferrule 152 via notches 156. Still referring to FIGS. 3-5, ferrule holder 154 includes protrusions 158 that are configured to be received into notches 156 in a snap fit configuration. As shown, protrusions 158 is integrally formed with ferrule holder 154. In some embodiments, ferrule holder 154 is made of a liquid crystal polymer or other materials such as polycarbonate (PC), polybutylene terephthalate, acrylonitrile butadiene styrene (ABS), PC/ABS blend, polymethylpentene (TPX or PMP), polycyclohexylenedimethylene terephthalate (PCT), cycloolefinic polymer (COC), glass filled PC, PBT or polyamides, or PC-siloxane, or any of the foregoing with glass or mineral reinforcement. In some embodiments, ferrule holder 154 has a processing temperature ranging between 100° C. and 350° C., between 150° C. and 300° C., or between 225° C and 300° C. as measured by a melt flow index. In some embodiments, ferrule holder 154 has a glass transition temperature ranging between 30° C. and 200° C. As used herein, "processing temperature" refers to a temperature in which the material is in a melted stated and is flowable during processing (e.g., injection molding).

Figure 6:
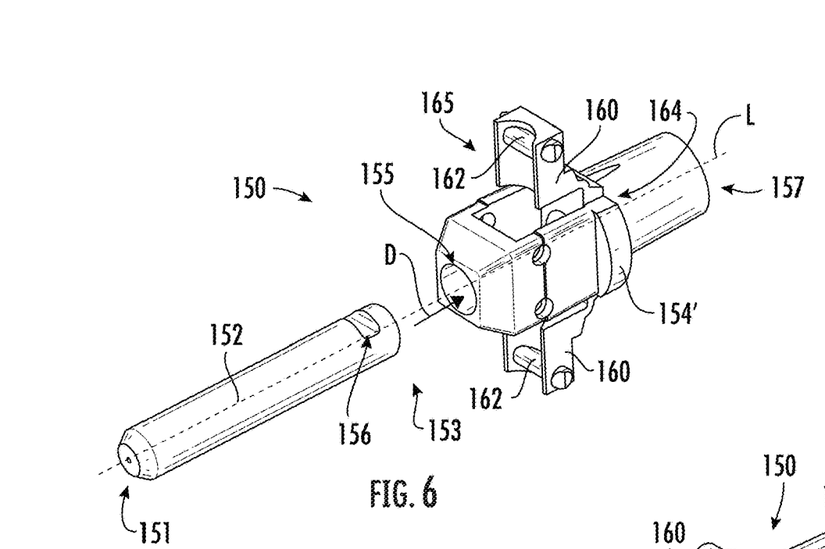
FIGS. 6-8 depict a ferrule and a corresponding molded ferrule holder and a method of coupling the ferrule and the molded ferrule holder in accordance with the present disclosure.
Figure 7:
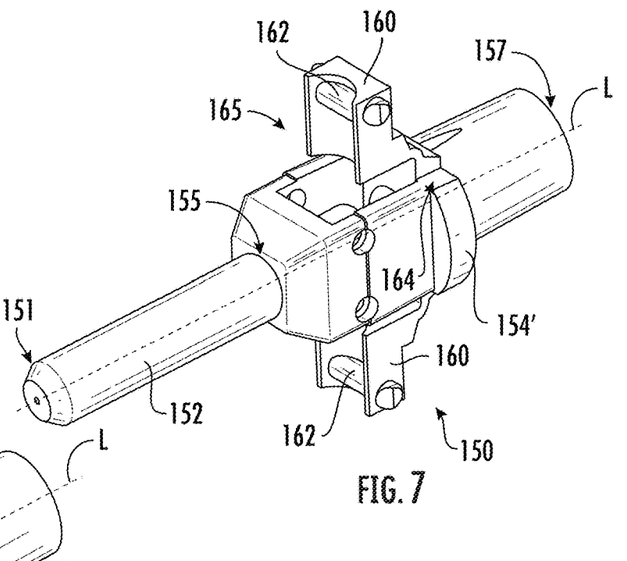
Figure 8:
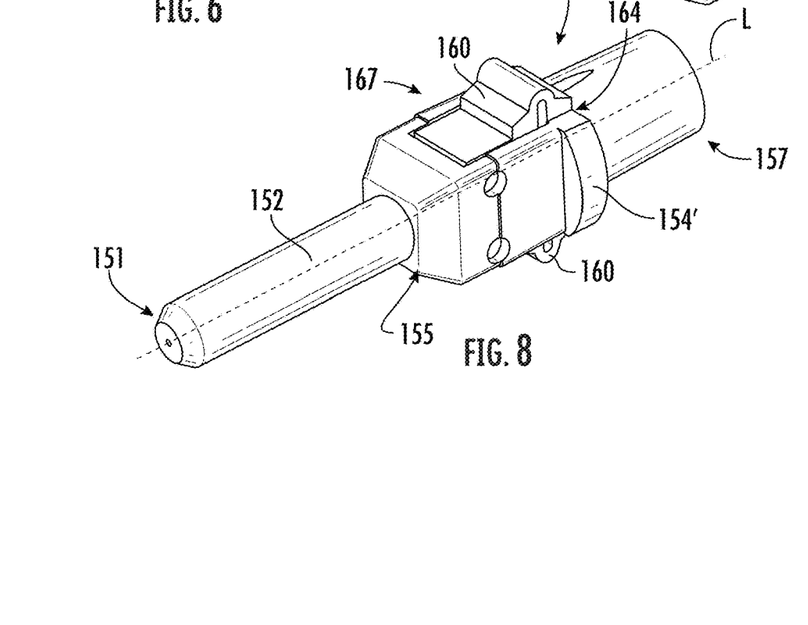
Figure 10:
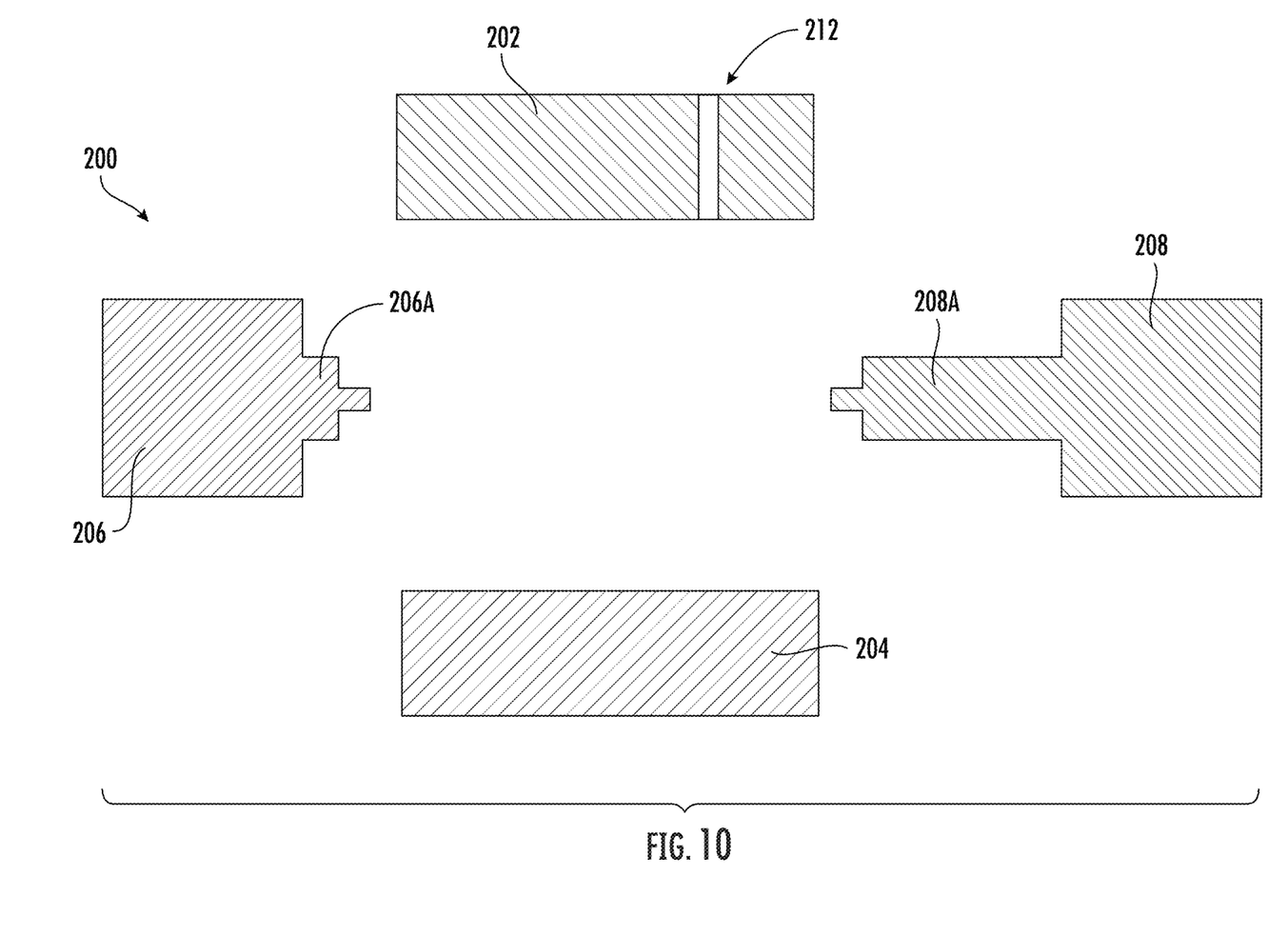
FIG. 10 is an exploded view of a mold used to create a ferrule holder configured to couple to a ferrule in accordance with the present disclosure.

Referring now to FIGS. 6-8, an alternate ferrule holder 154' is shown. Ferrule holder 154' includes a pair of flexible or rotatable arms 160 that are configured to engage with notches 156 on ferrule 152. Flexible arms 160 each include protrusion 162 that is sized to frictionally engage with notches 156 thereby coupling ferrule 152 to ferrule holder 154'. As shown in FIGS. 9 and 10, flexible arms 160 are movable between an open configuration 165 and a closed configuration 167. In particular, flexible arms 160 are movable about a pivot point 164 to transition between configurations 165, 167. Referring first to FIG. 7, open configuration 165 of ferrule holder 154' includes flexible arms 160 angled with respect to a longitudinal axis L of ferrule holder 154'. In some embodiments, flexible arms 160 are substantially perpendicular with longitudinal axis L. It is within the scope of the present disclosure that in alternate embodiments, other suitable non-zero angles between flexible arms 160 and longitudinal axis L are possible.

Referring now to FIG. 8, closed configuration 167 includes flexible arms 160 that are substantially parallel with longitudinal axis L such that protrusions 162 can engage with notches 156 of ferrule 152. As discussed in greater detail herein, ferrule holder 154 is movable between open configuration 165 and closed configuration 167 when assembling ferrule assembly 150.

Referring now to FIGS. 10-14, a method of creating ferrule holder 154, 154' is shown. Referring first to FIG. 10, a disassembled mold 200 is shown. Mold 200 shows a top piece 202, a bottom piece 204, and side pieces 206, 208 that couple to each other and couple to top piece 202 and bottom piece 204. When coupled together, top piece 202, bottom piece 204, and side pieces 206, 208 define an internal cavity 210 of mold 200.

Top piece 202 includes a channel 212 that extends through a thickness T of top piece 202 such that internal cavity 210 is in fluid communication with areas outside of mold 200.

Stated another way, channel 212 enables material 214 (FIGS. 11-13) to be inserted into cavity 210 to undergo further processing as discussed herein. As used herein, "material 214" refers to materials of ferrule holders 154, 154' as described above. Bottom piece 204 provides stability to mold 200. As mentioned previously, side pieces 206, 208 couple to each other in addition to coupling with top piece 202 and bottom piece 204. In particular, side pieces 206, 208 couple to each other by coupling respective couplers 206A, 208A such that interior aspects of ferrule holder 154, 154' (e.g., bore 168 of ferrule holder 154, 154') are defined once material is molded around couplers 206A, 208A.

Figure 11:
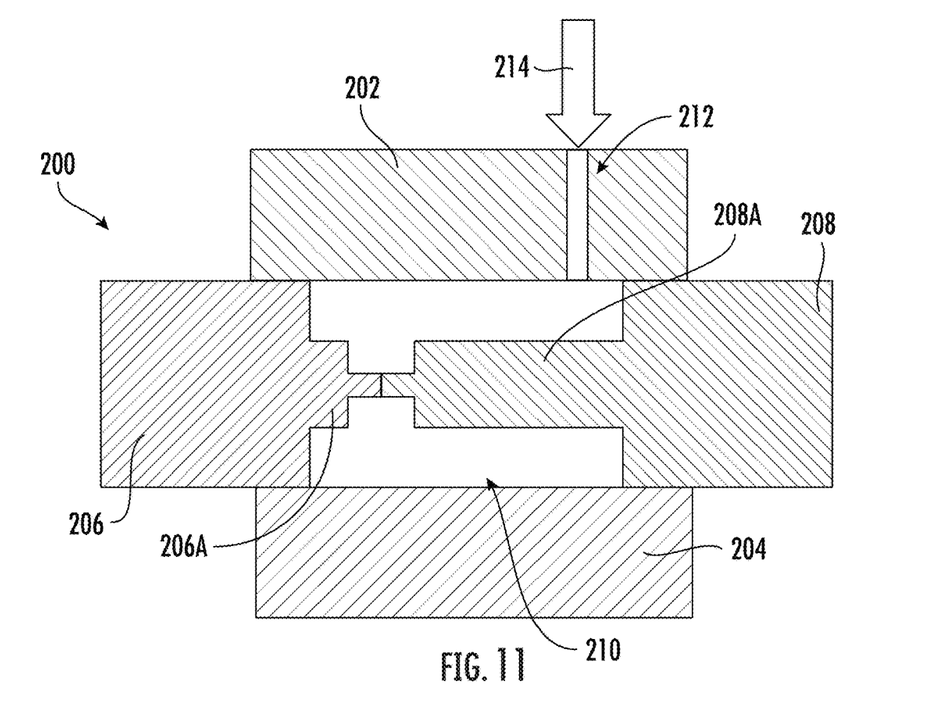
FIGS. 11-16 illustrate a method of creating the ferrule holder of FIGS. 3-9 and coupling the ferrule holder to a ferrule in accordance with the present disclosure.
Figure 12:
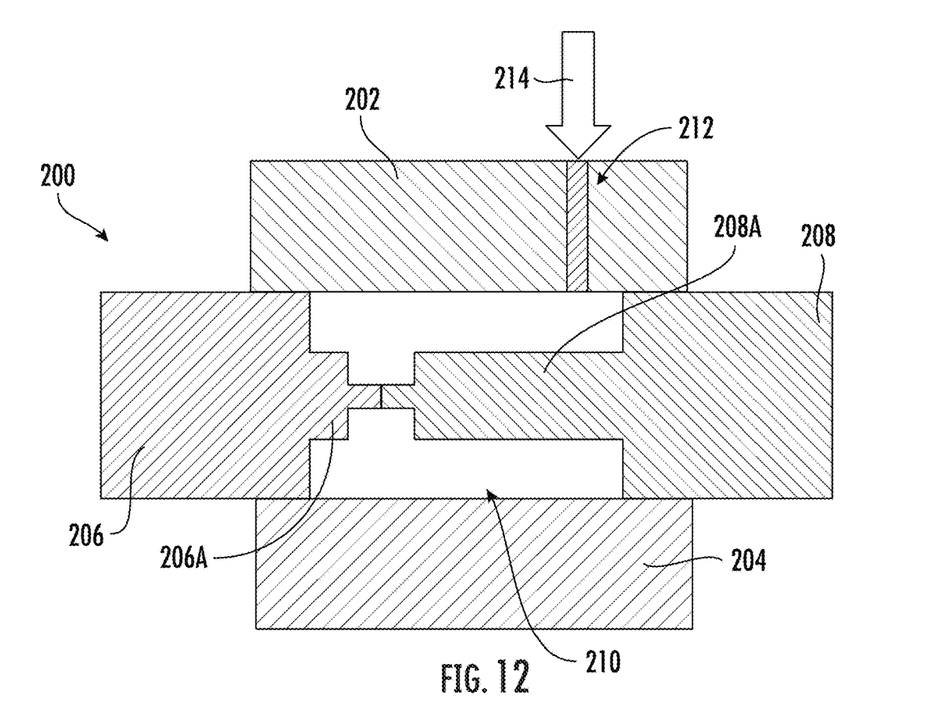
Figure 13:
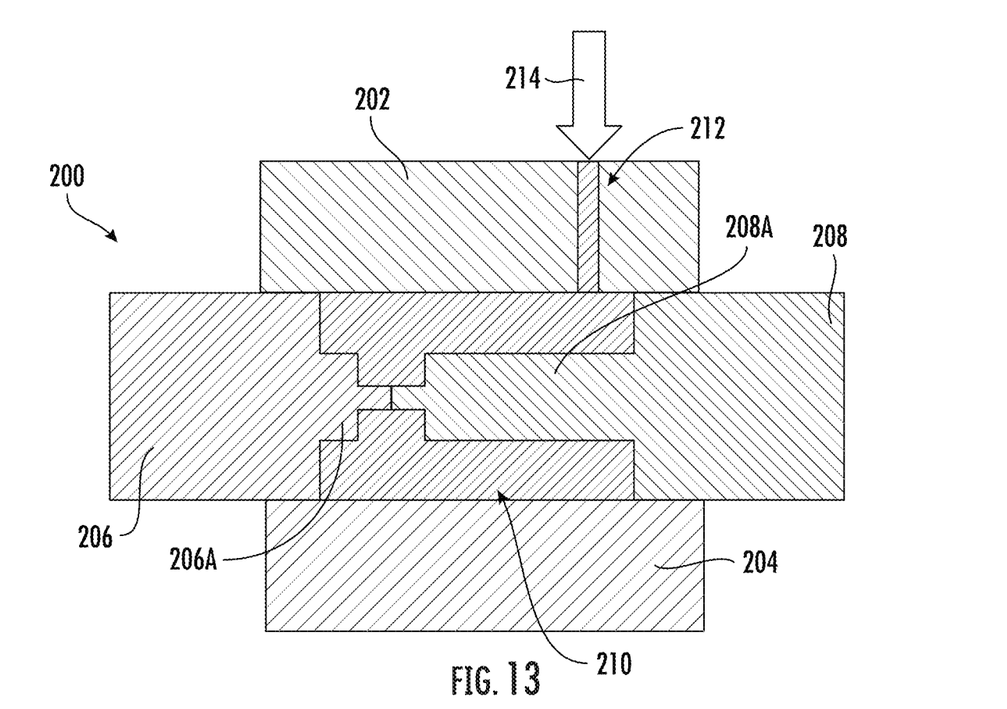

Referring now to FIGS. 11-13, once mold 200 is assembled, material 214 is inserted into mold 200 by injecting material 214 into cavity 210 via channel 212 of mold 200. In some embodiments, material 214 is in a melted state when injected into mold 200. Stated another way, material 214 is heated to the processing temperature discussed above and then injected into mold 200 via channel 212. As shown, material 214 is injected into mold 200 until cavity 210 is substantially filled. Once material 214 is injected, material 214 is cooled and solidified to form ferrule holder 154, 154'. In some embodiments, material 214 is cooled for a duration ranging between 0.5 seconds and 20 seconds.

Figure 14:
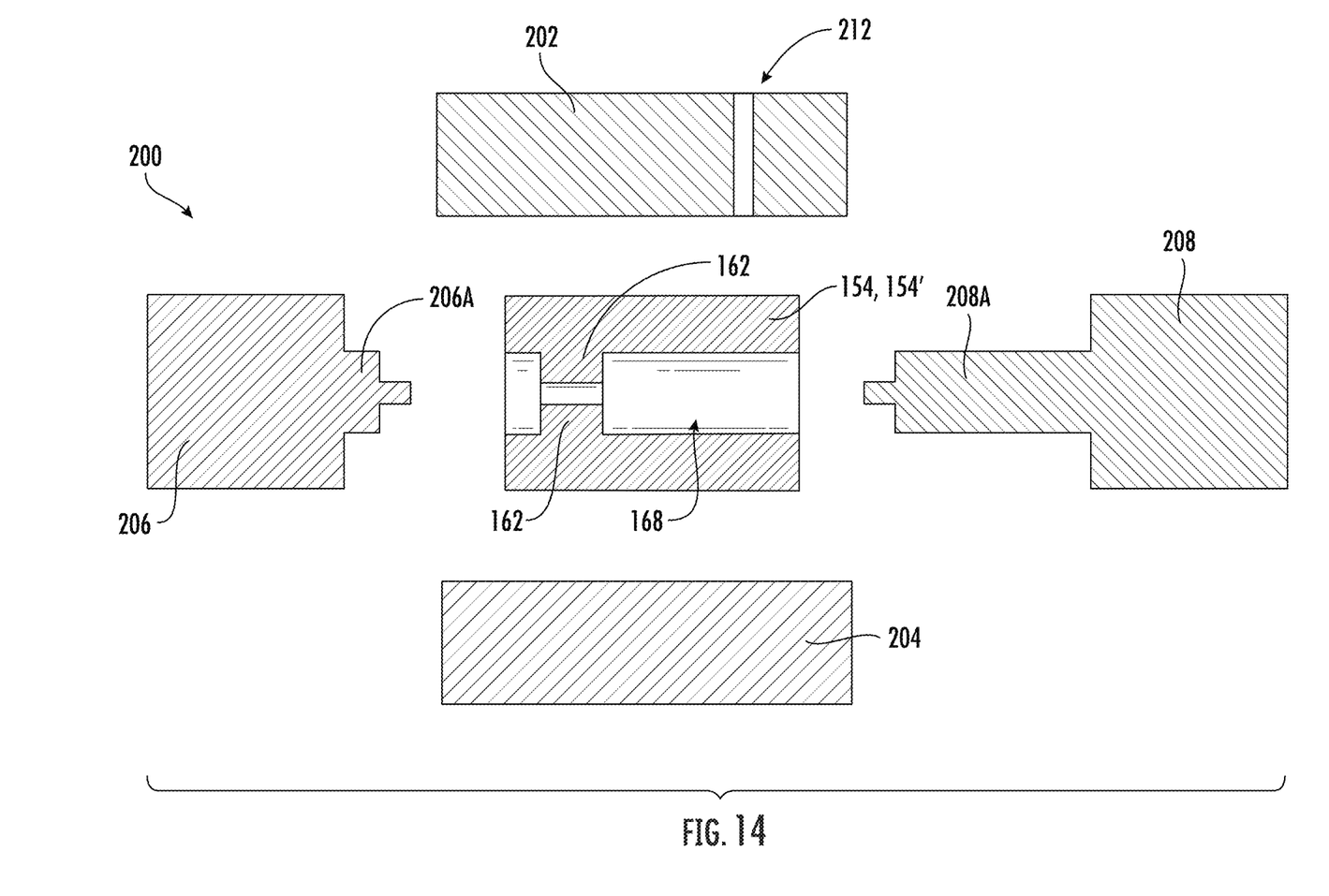

After material 214 is cured, mold 200 is then disassembled leaving ferrule holder 154, 154' as shown in FIG. 14. After ferrule holder 154, 154' is created, then a ferrule 152 can be coupled to ferrule holder 154, 154' to form ferrule assembly 150 as discussed below. However, in some embodiments, ferrule holder 154 is integrally molded into the molding of connector body or housing 122 (FIG. 2).

Figure 15:
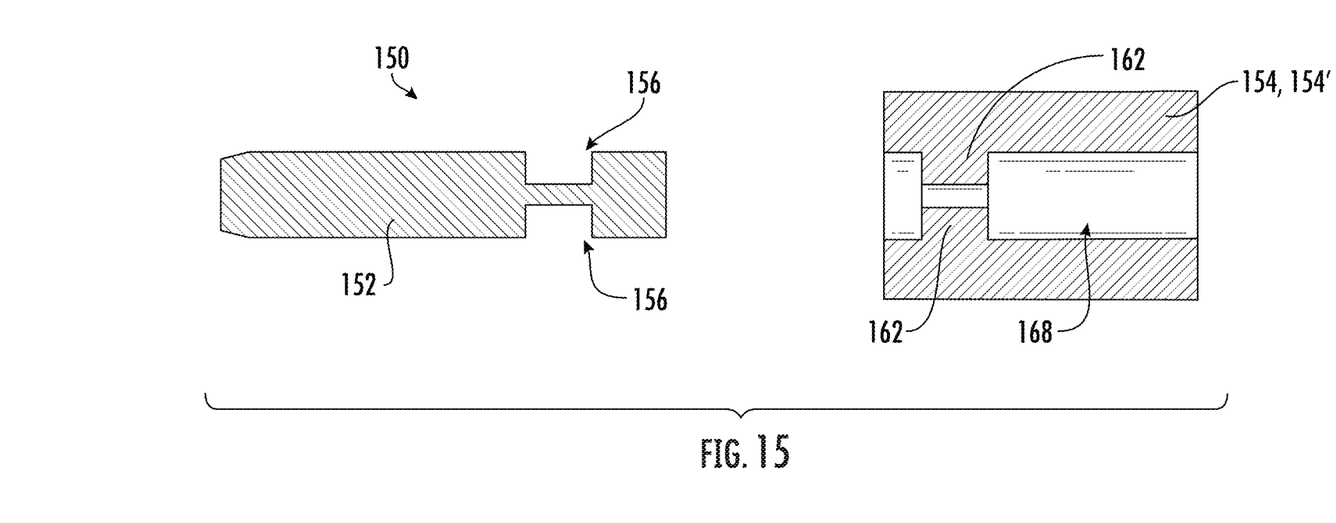
Figure 16:
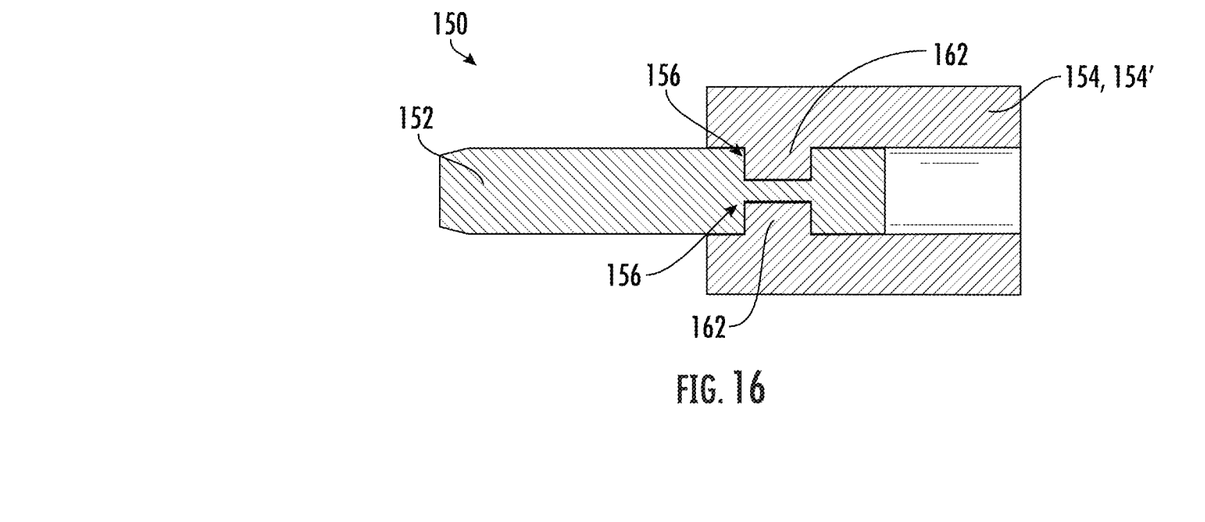

With reference to FIGS. 3-8 and 15-16, a method of assembling ferrule assembly 150 is shown. Referring first to FIGS. 3-5, to assemble ferrule assembly 150, ferrule 152 is inserted into ferrule holder 154. In particular, rear end 153 of ferrule 152 is inserted into first end portion 155 of ferrule holder 154 along direction D (FIGS. 6 and 15). In an alternate embodiment, front end 151 of ferrule 152 is inserted into second end portion 157 of ferrule holder 154 and advanced through bore 168 of ferrule holder 154 until front end 151 of ferrule 152 protrudes from front opening 163 of ferrule holder 154 such that notches 156 are in alignment with or engage with protrusions 162, 158, respectively. In some embodiments, ferrule 152 is laterally positioned within ferrule holder 154 and then, ferrule 152 is rotated within ferrule holder 154 such that notches 156 align with or engage with protrusions 162, 158, respectively. Referring to the embodiment shown in FIGS. 6-8, ferrule 152 is inserted into ferrule holder 154' when ferrule holder 154' is in an open configuration, and after insertion of ferrule 152 into ferrule holder 154', ferrule holder 154' moves to closed configuration 167 in which protrusions engage with notches 156 to form ferrule assembly 150. When coupling ferrule holder 154, 154' onto ferrule 152, a strain of about 4% to 6% is applied within ferrule holder 154, 154' as measured by ASTM D638, thereby allowing many materials to be used for ferrule holder 154, 154'.

There are many advantages to using ferrule holders 154, 154' as described in the present disclosure. Advantages to using ferrule holders 154, 154' include significant cost savings, the ability to manufacture ferrule holder components with little or no scrap through the use of hot runners and sprues, the ability to manufacture without costly automation on the molding press to align and place ferrule 152 into the machine for overmolding. In addition, ferrule holders 154, 154' allow for ferrule only processing at high temperatures without exposing ferrule holders 154, 154' to such high temperatures, which can decrease the processing times for ferrules.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A ferrule assembly comprising:
   a ferrule comprising a plurality of notches arranged around a circumference of the ferrule, wherein the plurality of notches is diametrically opposed about a longitudinal axis of the ferrule; and
   a ferrule holder coupled to the ferrule, wherein the ferrule holder is made of at least one of: a liquid crystal polymer, polycarbonate (PC), polybutylene terephthalate, acrylonitrile butadiene styrene (ABS), PC/ABS blend, polymethylpentene (TPX or PMP), polycyclohexylenedimethylene (PCT), cycloolefinic polymer (COC), glass filled PC, PBT or polyamides, or PC siloxane;
   wherein the ferrule holder imparts a strain of between about 4% to 6% onto the ferrule as measured by ASTM D638; and
   wherein the ferrule holder includes a plurality of flexible arms engageable with the plurality of notches of the ferrule.

2. The ferrule assembly of claim 1, wherein the plurality of flexible arms each include a protrusion corresponding to the plurality of notches, wherein the protrusions engage with the plurality of notches to couple the ferrule and the ferrule holder.

3. The ferrule assembly of claim 1, wherein the ferrule holder is movable between an open configuration and a closed configuration;
   wherein in the open configuration, the flexible arms are angled with respect to a longitudinal axis of the ferrule holder; and
   wherein in the closed configuration, the flexible arms are substantially parallel to the longitudinal axis and the flexible arms engage with the notches of the ferrule.

4. The ferrule assembly of claim 1, wherein the ferrule holder has a processing temperature between 100° C. and 300° C. as measured by a melt flow index.

5. A method of making a ferrule holder comprising:
   inserting a material into a cavity of a mold, wherein the cavity of the mold is shaped as the ferrule holder, wherein the material is in a molten state at a processing temperature ranging between 100° C. and 350° C. as measured by a melt flow index;
   cooling the material for a duration between 0.5 seconds and 20 seconds; and
   disassembling the mold;
   wherein the ferrule holder includes a plurality of flexible arms; and
   wherein the plurality of flexible arms each include a protrusion configured to engage with a respective one of a plurality of notches on a ferrule to couple the ferrule and the ferrule holder.

6. The method of claim 5, wherein the material is made of at least one of: a liquid crystal polymer, polycarbonate (PC), polybutylene terephthalate, acrylonitrile butadiene styrene (ABS), PC/ABS blend, polymethylpentene (PMP), polycyclohexylenedimethylene (PCT), cycloolefinic polymer (COC), polyamides, or PC siloxane.

7. The method of claim 5, wherein the material is selected from the group consisting of: a liquid crystal polymer, polycarbonate (PC), polybutylene terephthalate, acrylonitrile butadiene styrene (ABS), PC/ABS blend, polymethylpentene (PMP), polycyclohexylenedimethylene (PCT), cycloolefinic polymer (COC), polyamides, or PC siloxane.

8. The method of claim 5, wherein the processing temperature is between 150° C. and 300° C. as measured by a melt flow index.

9. The method of claim 5, wherein the ferrule holder has a processing temperature between 225° C. and 300° C. as measured by a melt flow index.

10. The method of claim 5, wherein the ferrule holder is movable between an open configuration and a closed configuration;
wherein in the open configuration, the flexible arms are angled with respect to a longitudinal axis of the ferrule holder; and
wherein in the closed configuration, the flexible arms are substantially parallel to the longitudinal axis and the flexible arms engage with the notches of the ferrule.

11. A method of assembling a ferrule and a ferrule holder to form a ferrule assembly, wherein the ferrule includes a front end, a rear end, and a plurality of notches around a circumference of the ferrule, and wherein the ferrule holder includes the plurality of flexible arms each having a protrusion, the plurality of flexible arms defining a front opening, the method comprising:
inserting a rear end of the ferrule into the front opening of the ferrule holder; and
engaging the plurality of protrusions with the plurality of notches to couple the ferrule and the ferrule holder in a snap fit configuration;
wherein the ferrule holder imparts a strain of between about 4% to 6% onto the ferrule as measured by ASTM D638.

12. The method of claim 3, wherein the ferrule holder is movable between an open configuration and a closed configuration;
wherein in the open configuration, the flexible arms are angled with respect to a longitudinal axis of the ferrule holder; and
wherein in the closed configuration, the flexible arms are substantially parallel to the longitudinal axis and the flexible arms engage with the notches of the ferrule.

13. The method of claim 12, wherein the ferrule is inserted into the ferrule holder when the ferrule holder is in the open configuration, and the ferrule holder moves to the closed configuration once the notches are within a bore of the ferrule holder such that the plurality of protrusions of the flexible arms of the ferrule holder engage with the plurality of notches.

14. The method of claim 11, wherein the ferrule holder is made of at least one of: a liquid crystal polymer, polycarbonate (PC), polybutylene terephthalate, acrylonitrile butadiene styrene (ABS), PC/ABS, polymethylpentene (TPX or PMP), polycyclohexylenedimethylene (PCT), cycloolefinic polymer (COC), glass filled PC, PBT or polyamides.

15. A fiber optic connector assembly comprising:

an inner housing having an internal cavity;

a ferrule assembly received in the internal cavity, the ferule assembly comprising:
a ferrule comprising a plurality of notches arranged around a circumference of the ferrule, wherein the plurality of notches are diametrically opposed about a longitudinal axis of the ferrule; and
a ferrule holder coupled to the ferrule, wherein the ferrule holder is made of at least one of: a liquid crystal polymer, polycarbonate (PC), polybutylene terephthalate, acrylonitrile butadiene styrene (ABS), PC/ABS blend, polymethylpentene (TPX or PMP), polycyclohexylenedimethylene (PCT), cycloolefinic polymer (COC), glass filled PC, PBT or polyamides, or PC siloxane;

wherein the ferrule holder imparts a strain of between about 4% to 6% onto the ferrule as measured by ASTM D638, and wherein the ferrule holder includes a plurality of flexible arms engageable with the plurality of notches of the ferrule.

* * * * *

UNITED STATES PATENT AND TRADEMARK OFFICE
CERTIFICATE OF CORRECTION

| | | |
|---|---|---|
| PATENT NO. | : 11,808,993 B2 | |
| APPLICATION NO. | : 17/521013 | |
| DATED | : November 7, 2023 | |
| INVENTOR(S) | : Adra Smith Baca et al. | |

It is certified that error appears in the above-identified patent and that said Letters Patent is hereby corrected as shown below:

In the Claims

In Column 9, Line 37, in Claim 12, delete "3," and insert -- 11, --.

Signed and Sealed this
Thirtieth Day of April, 2024

Katherine Kelly Vidal
*Director of the United States Patent and Trademark Office*